United States Patent
Kopelman et al.

(10) Patent No.: US 8,743,882 B1
(45) Date of Patent: Jun. 3, 2014

(54) PACKET HEADER ALTERING DEVICE

(71) Applicant: Marvell Israel (M.I.S.L) Ltd., Yokneam (IL)

(72) Inventors: Yaniv Kopelman, Holon (IL); Nafea Bishara, Tarshiha (IL); Yariv Anafi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 13/863,858

(22) Filed: Apr. 16, 2013

Related U.S. Application Data

(63) Continuation of application No. 12/283,011, filed on Sep. 9, 2008, now Pat. No. 8,428,061, which is a continuation of application No. 10/191,663, filed on Jul. 8, 2002, now Pat. No. 7,424,019.

(60) Provisional application No. 60/333,709, filed on Nov. 27, 2001.

(51) Int. Cl.
  *H04L 12/28* (2006.01)
  *H04L 29/06* (2006.01)
  *H04L 12/56* (2006.01)
  *H04L 12/54* (2013.01)

(52) U.S. Cl.
  CPC ........ *H04L 29/0653* (2013.01); *H04L 49/9042* (2013.01); *H04L 12/56* (2013.01)
  USPC ........................................................ 370/392

(58) Field of Classification Search
  CPC .................................................. H04L 29/0653
  USPC .......................................................... 370/392
  See application file for complete search history.

(56) References Cited

U.S. PATENT DOCUMENTS

| | | | |
|---|---|---|---|
| 4,755,986 A * | 7/1988 | Hirata | 370/392 |
| 5,864,553 A | 1/1999 | Aramaki | |
| 5,905,725 A | 5/1999 | Sindhu et al. | |
| 5,918,074 A | 6/1999 | Wright et al. | |
| 5,999,536 A * | 12/1999 | Kawafuji et al. | 370/401 |
| 6,041,058 A * | 3/2000 | Flanders et al. | 370/401 |
| 6,160,808 A * | 12/2000 | Maurya | 370/389 |
| 6,163,539 A | 12/2000 | Alexander et al. | |
| 6,167,091 A | 12/2000 | Okada et al. | |
| 6,400,730 B1 | 6/2002 | Latif et al. | |
| 6,424,658 B1 | 7/2002 | Mathur | |
| 6,570,875 B1 | 5/2003 | Hegde | |
| 6,831,893 B1 | 12/2004 | Nun et al. | |
| 7,035,226 B2 | 4/2006 | Enoki et al. | |
| 2002/0085560 A1 | 7/2002 | Cathey et al. | |
| 2002/0156898 A1 | 10/2002 | Poirier et al. | |
| 2002/0163935 A1 | 11/2002 | Paatela et al. | |
| 2007/0220189 A1 | 9/2007 | Lim et al. | |

* cited by examiner

*Primary Examiner* — Mark Rinehart
*Assistant Examiner* — Maharishi Khirodhar

(57) ABSTRACT

A packet processor for a network device includes an incoming port that receives a first packet. The first packet includes a data portion, a control portion and a first outgoing port. A control data processing device receives the control portion from the incoming port while the data portion is stored in memory, and transmits the control portion to the first outgoing port. The first outgoing port transmits a first request for the data portion based on the control portion. A header altering device retrieves the data portion from the memory and strips, modifies, and encapsulates the data portion based on the first request.

20 Claims, 10 Drawing Sheets

PACKET HEADER ALTERING DEVICE

CROSS-REFERENCE TO RELATED APPLICATIONS

The present disclosure is a continuation of U.S. patent application Ser. No. 12/283,011 (now U.S. Pat. No. 8,428,061), filed on Sep. 9, 2008, which is continuation of U.S. patent application Ser. No. 10/191,663 (now U.S. Pat. No. 7,424,019), filed Jul. 8, 2002, which claims the benefit of U.S. Provisional Application No. 60/333,709, filed on Nov. 27, 2001. The entire disclosures of the applications referenced above are incorporated herein by reference.

FIELD OF THE INVENTION

The present invention relates to packet header altering devices, and more particularly to packet header altering devices in multi-layer and/or multi-protocol network switches, routers and/or other packet processing devices.

BACKGROUND OF THE INVENTION

In the late 1980's and early 1990's, Internet Protocol (IP) Routing and other higher layer protocol routing/switching was typically performed in software. The modification of packet headers was generally performed by general purpose processors and memory that executed header altering software code. For layer 2 and layer 3 switches, the header altering software modified one or two fields of the packet header when relaying the packet from one port to another port of the switch.

More recently, packets have become more complex and often include multiple ports with different protocols and layering of protocols. Sophisticated packet alteration of layer 3 and above in the seven layer OSI model is now required. Conventional software approaches strip protocol layers one at a time from the packet. When the desired layer is reached, modification is performed. Then, new layers are encapsulated one at a time onto the packet. These approaches also perform packet alteration on packet ingress to the packet processor. The conventional software approach is cumbersome and prone to errors, particularly for multicast packets that are sent to different types of ports, such as bridged or tunneled Ethernet, unicast or multicast multi-protocol label switching (MPLS), and IPv4 and IPv6 routed.

SUMMARY OF THE INVENTION

A packet processor for a router/switch according to the present invention alters headers of packets and includes an incoming port and a first outgoing port. A control data processor receives a first control portion of the first packet from the incoming port and transmits the first control portion to a first outgoing port. A header altering device strips, modifies and encapsulates a first portion on egress from the packet processor based upon first protocol layering requirements of the first outgoing port.

In other features, the control data processor transmits the first control portion to a second outgoing port. The second outgoing port has second protocol layering requirements. The header altering device strips, modifies and encapsulates the first portion on egress from the packet processor based upon the second requirements of the second outgoing port. The control data processor transmits the first control portion to a third outgoing port. The third outgoing port has third layering requirements. The header altering device strips, modifies and encapsulates the first portion on egress from the packet processor based upon the third layering requirements of the third outgoing port.

In still other features, a first table communicates with the header altering device and stores tunnel entries. A second table communicates with the header altering device and stores address resolution protocol (ARP) entries.

In still other features, the header altering device includes a stripping stage that strips unnecessary layers from the first portion. A header manipulator stage communicates with the stripping stage and performs header manipulation on a header of the first portion. A tunneling stage communicates with the header manipulator stage and selectively adds and removes tunnels from the first portion if needed. An encapsulation stage communicates with the tunneling stage and adds protocol layering that is required by at least one outgoing port.

In still other features, the header altering unit receives input encapsulation data, last level treated data, switch commands, and output encapsulation from the control data processor. The stripping stage initiates a tunnel request to a first table that stores tunnel data for the first portion. A tunnel sync stage communicates with the stripping stage and synchronizes tunnel data returned from the first table with the stripped first portion.

In yet other features, the header manipulator stage communicates with a second table that stores address resolution protocol (ARP) data. An ARP sync stage communicates with the tunneling stage and synchronizes ARP data returned from the second table with the stripped and modified first portion. The encapsulation stage includes a link layer stage that communicates with the ARP sync stage and that selectively adds a link layer to the stripped and modified first portion. The encapsulation stage includes a point to point (PPP) layer stage that communicates with the link layer stage and that selectively adds a PPP layer to the stripped and modified first portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
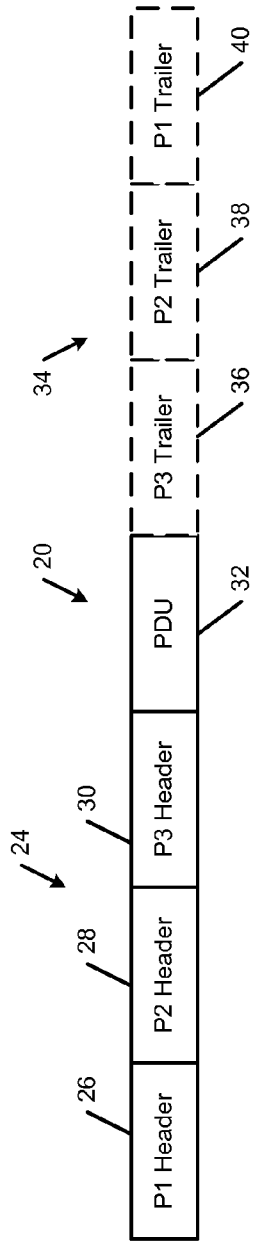
FIG. 1 illustrates a packet including one or more protocol headers, a protocol data unit and one or more protocol trailers.
Figure 2:
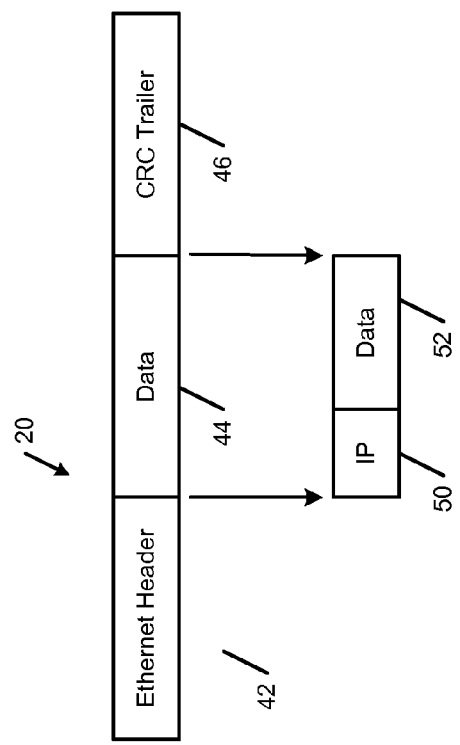
FIG. 2 illustrates an exemplary packet including an Ethernet header, data (with an IP header and data contained therein), and a CRC trailer.

Referring now to FIG. 1, a packet 20 may include one or more protocol headers that are generally identified at 24. For example, the protocol headers may include a first protocol header 26, a second protocol header 28, and a third protocol header 30. A protocol data unit (PDU) 32 contains data. Protocol trailers that are generally identified at 34 optionally follow the PDU 32. The protocol trailer 34 may include a third protocol trailer 36 followed by a second protocol trailer 38 and a first protocol trailer 40. An example packet 20 is illustrated in FIG. 2. For Layer 2 switching, the packet 20 contains an Ethernet header 42, a data field 44, and a cyclic redundancy check (CRC) trailer 46. The data field 44 may contain an embedded IP header 50 and a data field 52 for Layer 3 switching.

Figure 3:
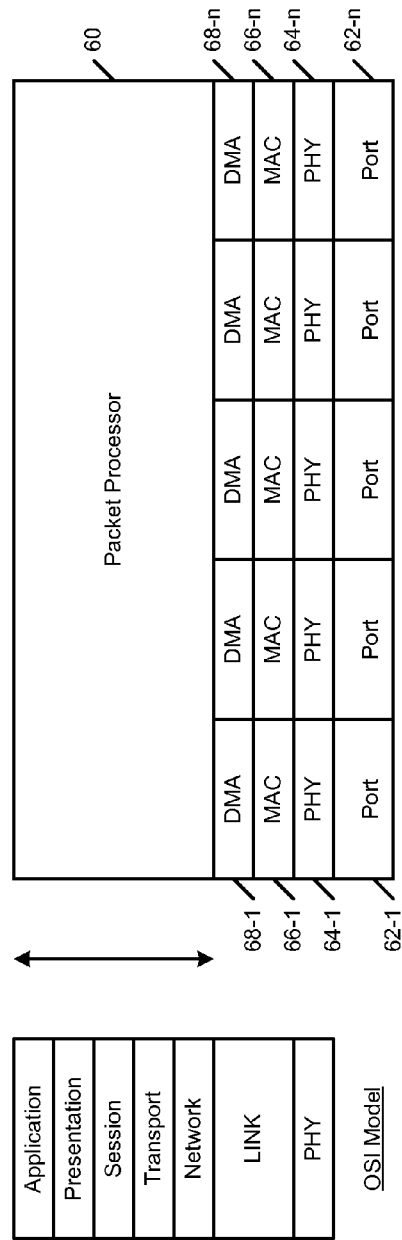
FIG. 3 is a functional block diagram illustrating a packet processor according to the present invention.
Figure 4:
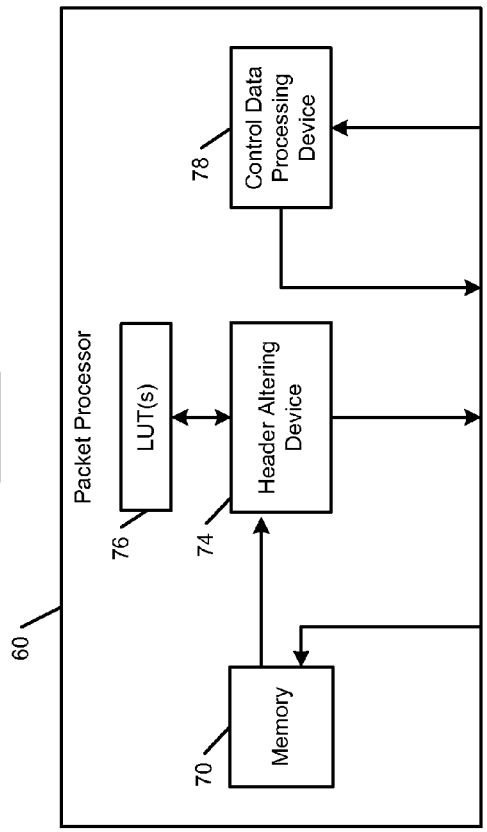
FIG. 4 is a functional block diagram illustrating the packet processor of FIG. 3 in more detail and including a header altering device according to the present invention.

Referring now to FIG. 3, a packet processor 60 includes multiple ports 62-1, 62-2, ..., and 62-n. As used herein, the term ports includes both physical and logical ports. The ports 60 include physical layers 64-1, 64-2, ..., and 64-n, media access control (MAC) layers 66-1, 66-2, ..., and 66-n, and direct memory access (DMA) 68-1, 68-2, ..., and 68-n. The ports may be Ethernet bridged or tunneled, IPv4 or IPv6 routed, MPLS unicast or multicast switched ports, and/or any other type of port. The packet processor 60 modifies a header of the packet 20 at layer 3 and above in a 7-layer OSI model. Referring now to FIG. 4, the packet processor 60 includes memory 70, a header altering device 74, one or more lookup tables 76, and a control data processing unit 78.

Figure 5:
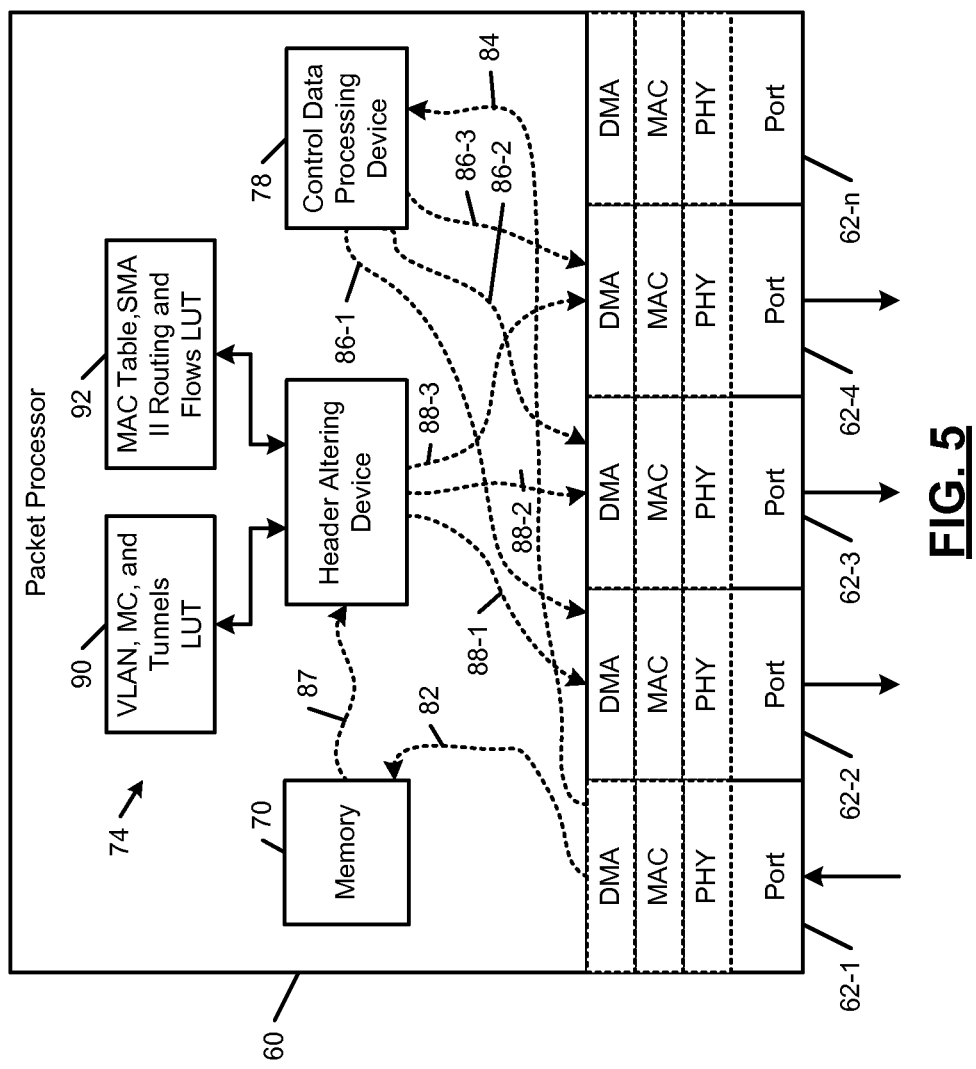
FIG. 5 illustrates an example of multicasting and egress processing that is performed by the packet processor according to the present invention.

Referring now to FIG. 5, when a packet 20 is received by a port 62, data from the packet 20 is stored in the memory 70. Concurrently, control data from the packet is stored in the control data processing unit 78. Control data is sent by the control data processing unit to one or more of the ports 62. The ports 62 request matching data that is stored in the memory 70. The header altering unit 74 responds by reading the data from the memory 70, altering the header as required by the corresponding port, and transmitting the modified packet to the port 62 for transmission. The port 62 may recalculate the checksum if needed.

In the illustrated example, the port 62-1 receives a packet 80. Data from the packet 80 is stored in the memory 70 as indicated at 82. Concurrently, control data from the packet 80 is stored in the control data processing unit 78 as indicated at 84. The control data processing unit 78 sends control data to the ports 62-2, 62-3, and 62-4 as indicated at 86-1, 86-2, and 86-3. The ports 62-2, 62-3, and 62-4 request data from the memory 70. The header altering device 74 reads the data from the memory 70 as indicated at 87. The header altering device 74 modifies data in the memory 70 based upon the requirements specified by the port 62-2, 62-3, and 62-4 as indicated at 87 and 88-1, 88-2, and 88-3. The lookup tables 76 may include VLAN, MC and tunnel table 90 (hereinafter VLAN table 90) and MAC and routing flows table 92 (hereinafter MAC table 92). Tunnel entries are preferably stored in the VLAN table 90 and address resolution protocol (ARP) entries are preferably stored in the MAC table 92.

Changes to the packet 20 that are performed by the header altering unit 74 depend upon several inputs. A first input relates to input encapsulation data, which is the format that the packet is saved in the memory 70. A second input relates to a last level treated, which is a type of switch/router/bridge that last worked on the packet 20. A third input relates to commands from a switch/router/bridge engine, such as specific changes that should be made to the inner packet header. A fourth input relates to an output encapsulation for the packet 20.

Figure 6:
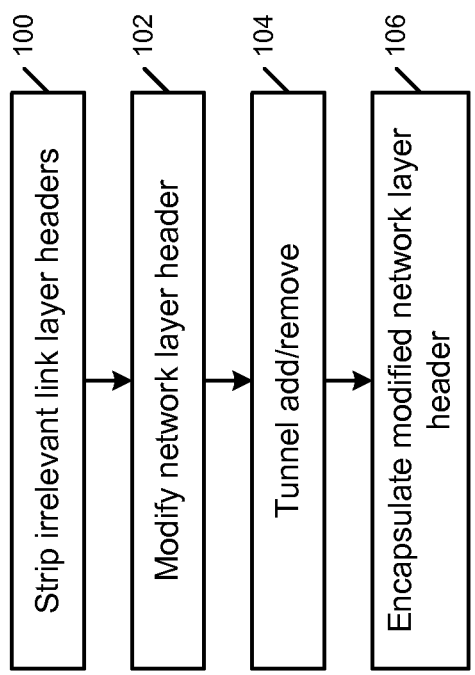
FIG. 6 illustrates operational stages of the header altering device of FIG. 4.

Referring now to FIG. 6, the header altering device 74 alters the packet 20 in four main stages. In a first stage 100, the header altering device 74 strips the packet 20 from outer encapsulation layers based on the input encapsulation and the last level treated. For example, headers surrounding the IP header of a routed packet are stripped. In a second stage 102, the header altering device 74 manipulates a current header. For example, the header altering device 74 decrements an IPv4 time to live (TTL) field and updates a checksum. In a third stage 104, the header altering device 74 adds or removes tunneling. In a fourth stage 106, the header altering device 74 encapsulates a new outer header onto the packet 20.

The header altering device 74 preferably performs header alteration in a pipeline manner. Each pipeline stage is assigned one or more tasks. The pipeline stages use information that is passed from stage to stage in a descriptor word. Stages add information to the descriptor word if the information is needed in a subsequent stage and delete information that is not needed by subsequent stages.

If changes to the header that are made by a stage change the length of the packet 20, the stage updates an 8-bit field representing changes to a byte count of the packet 20. The update to the 8-bit field is equal to a bit length increase or decrease of a current stage plus bit length changes from prior stages. The 8-bit field has 1 bit sign and 7 bit offset (change will be from −127 byte to +127 byte). Shorter or longer fields may be employed to represent shorter or longer changes.

Figure 7:
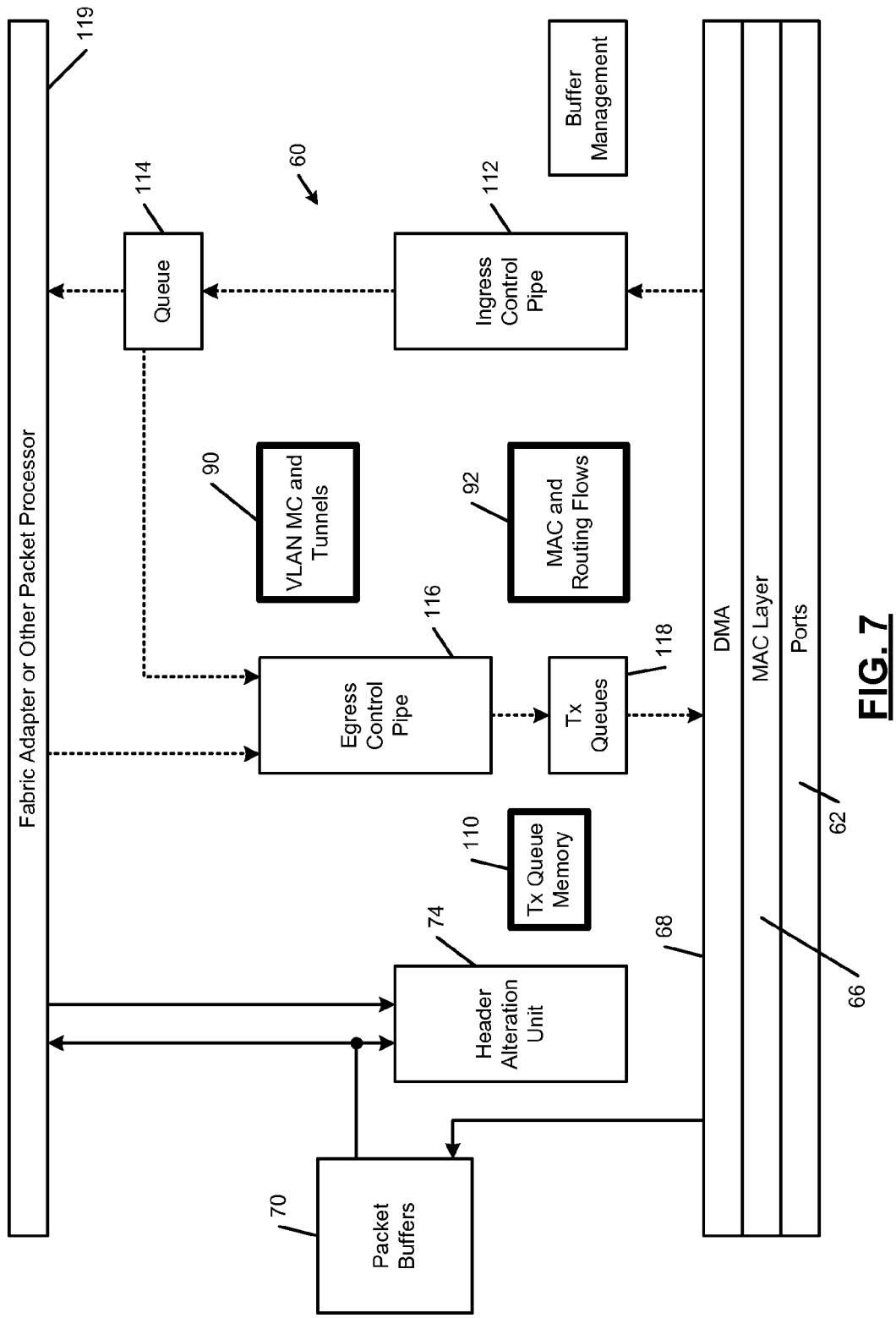
FIG. 7 is a functional block diagram illustrating the packet processor in further detail.

Referring now to FIG. 7, an exemplary architecture incorporating the header altering device 74 is shown. Solid lines are data flow paths and dotted lines are descriptor flow paths. Blocks in bold (such as a transmit queue memory 110, the VLAN table 90, and the MAC table 92) are preferably implemented using on-chip memory.

Data from the packet 20 (except for the first 128 bytes) are written to the memory 70, which provides packet buffering. After the packet 20 passes a check-in performed by the MAC layer 66, the header and descriptor are forwarded to an ingress control pipe 112. The header and descriptor are forwarded through an queue 114, an egress control pipe 116, and a transmit queue 118 to one or more outgoing ports 62. A fabric adapter or other packet processor 119 may be provided.

The outgoing port(s) 62 request data from the memory 70. The header altering device 74 reads the data from the memory 70, modifies the data as needed for each of the ports 62, and outputs the data to the requesting ports 62. As can be appreciated, by processing the layers during egress, the speed of the packet processor 60 is increased and the complexity is reduced, particularly for multi-port, multi-protocol packet processors.

Figure 8:
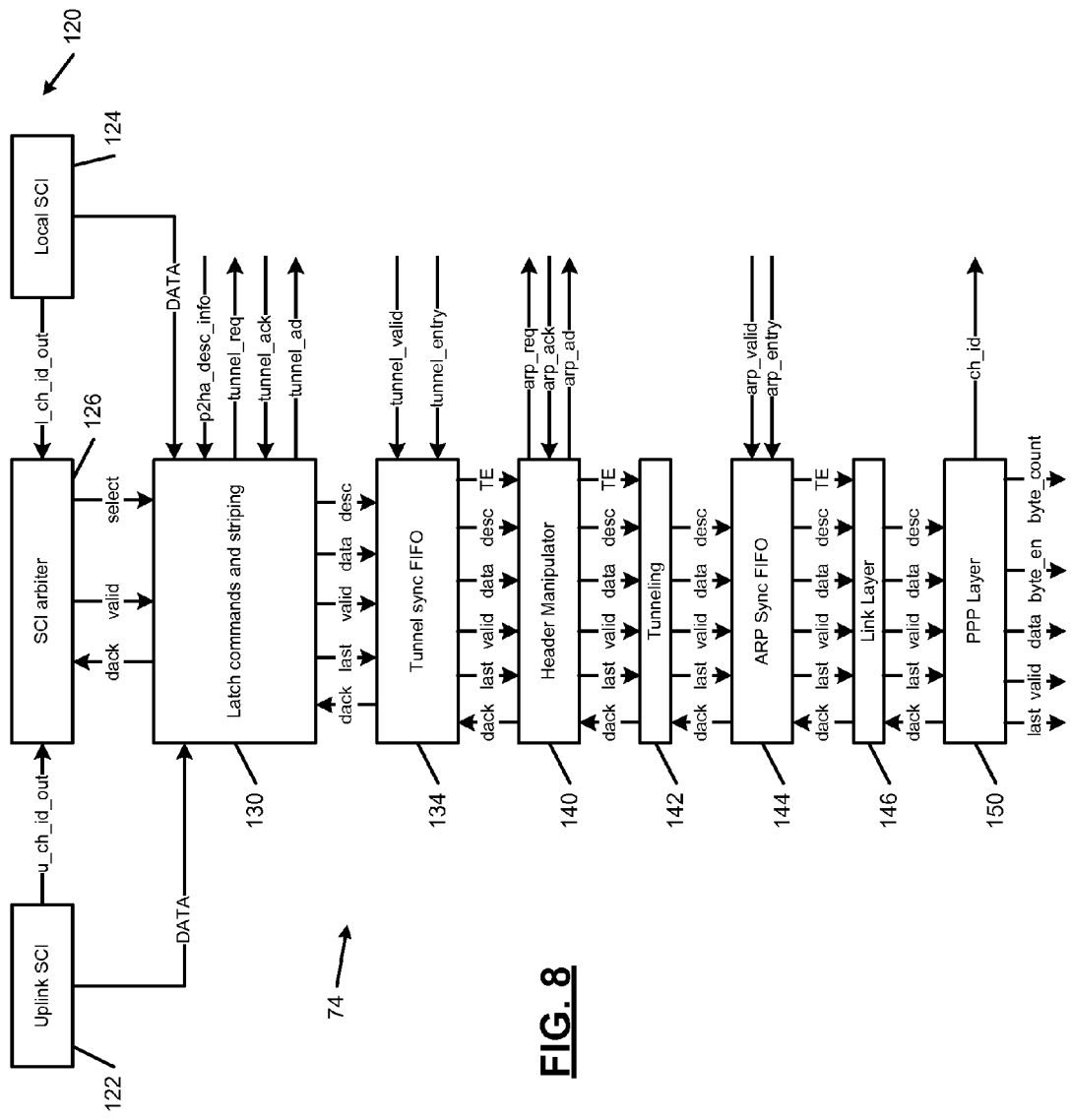
FIG. 8 is a functional block diagram illustrating the header altering device in further detail.

Referring now to FIGS. 8-12, a presently preferred implementation is shown. In FIG. 8, the header altering device 74 is shown. The header altering device 74 operates in a pipeline manner. The header altering device 74 includes a source channel identifier (SCI) stage 120. Since every DMA 68 can request up to 8 data bursts, each burst returned from the memory 70 identifies the DMA 68 that originated the burst. There also may be two modules for each DRAM, an uplink and a local DRAM module. A source channel identifier (SCI) arbiter 126 controls data from the DRAM modules using uplink SCI 122 and local SCI 124. This SCI stage 120 in the pipeline preferably holds up to 3 cycles of a burst in order to enable the arbitration and identification of the source channel number. If both DRAM modules have a burst at the same time, one of the DRAM modules will be paused, for example in a round robin manner.

In a latching commands and header striping stage 130, the pipeline selects the data from the correct DRAM based on the arbitration between the uplink SCI 122 and the local SCI 124. The latching commands and header striping stage 130 is also responsible for locking the commands of the DMA that are identified by the source channel number. After locking the commands and the data, the latching commands and header striping stage 130 examines the content of the commands from the port and the data from the DRAM. The stage 130 strips off the unnecessary layers. Data output by the stage 130 includes a header corresponding to the last level treated inside the packet processor. The stage 130 also requests reads for tunnel entries when commands from the port require it.

In a tunnel sync FIFO stage 134, data is held until a tunnel entry is retrieved from VLAN memory 90. Data from the previous stage and tunnel entries enter the tunnel FIFO stage 134. At the output of the tunnel FIFO stage 134, both data and tunnel entries exist together until a header manipulator stage 140.

In the header manipulator stage 140, header manipulation is performed on an innermost header, preferably layer 3 and/or below in the OSI 7 layer model. Details concerning the header protocols are specified in IEEE section 802.1D, IEEE section 802.1q, and RFC791, which are hereby incorporated by reference. The header manipulator stage 150 also reads ARP entries in the MAC memory 92. The outputs of the header manipulator stage 140 are input to a tunneling stage 142, which holds the data until tunnel entry data is received (if applicable). The outputs of the tunneling stage 142 are input to an ARP sync FIFO stage 144. The ARP sync FIFO stage 144 is a similar to the tunnel sync FIFO stage 134. The ARP sync FIFO stage 144 is used to hold the data until the ARP entry is retrieved from MAC memory 92.

In a link layer stage 146, a pipe MAC is added to the packet 20 if needed. In a PPP layer stage 150, a PPP type header is attached to the packet 20 for ports that are operating in packet over SONET (PoS) mode. The PPP layer stage 150 calculates the new byte count of the packet 20 for all the packets. The PPP layer stage 150 is the last stage in the pipeline. From this point, the modified data is transferred to the DMA(s) 68 of the requesting port(s) 62.

Valid, last, and dack control signals are used between stages 130-150. Data is preferably valid and sampled only when both valid and dack signals are active. A descriptor from stage to stage is transferred during a first cycle of valid data, unless specified otherwise. The dack signal is used in inter-stage interfaces because most of the stages cannot hold a whole burst. The channel id (ch_id) is carried from stage to stage with the descriptor information. A do_ha bit in the descriptor at each stage indicates whether the stage should perform modifications of the data or carry the data in a transparent mode.

The source channel identifier stage 120 is not part of the header altering device 74. The select signal from the arbiter 126 is used to select the local SCI 122 or uplink SCI 124 to the next stage. The local and uplink SCI 122 and 124 include two components. A first component is a FIFO that saves the channel number for each read request from the appropriate DRAM. The channel number is written whenever ch_id_strb_is active. The channel number is popped out of the FIFO whenever last_in_is active or whenever a read pointer changes to a write pointer, which occurs when the FIFO changes state from empty to not empty.

The channel number is preferably a 4 bit number. A most significant bit of the channel number represents a GOP (Group Of Ports) number. The least significant bits represent the port index inside each GOP. There are 2 GOPs—each with an arbiter. A ch_id_strb_input and ch_id input for each GOP is provided. Both GOP cannot output a ch_id_strb_during the same cycle since this is dependent on the service that the GOP obtains from a common arbiter.

When passing data from the DRAM to the latching commands and striping stage 130, the SCI data path has a single 128 bit register to sample data from the DRAMs and enable control blocks to act. Data is sampled and moved on every clock cycle regardless of the control. The control, which is done by the SCI arbiter 126, ensures that the next stage 130 samples valid data.

The SCI arbiter 126 generates control signals for both DRAM interfaces. The SCI arbiter 126 selects one of the SCI 122 and 124 to transfer the data into the header altering device 74 and blocks the other SCI. The SCI arbiter 126 obtains the port number from both SCI and selects one of the port numbers to send to the ports. The SCI arbiter 126 generates a high (not active) dack signal to DRAM interface which is NOT selected at the moment. The dack signal to the selected DRAM interface is based on the incoming dack signal from the header altering device 74.

In the latch command and stripping stage 130, the unneeded packet headers are removed and the protocol that was used for the forwarding decision becomes the outer protocol. The removal of the extra layers is made while the burst passes through the latch command and stripping stage 130. The entire burst, however, does not need to be stored in the latch command and stripping stage 130. During the first cycle of data transfer from the SCI stage 120, the descriptor commands are locked in the latch command and stripping stage 130. The latch command and striping stage 130 determines the number of bytes to remove. Stripping is needed when Input_Encap is Ethernet or MPLS and Last Level Treated is IP or MPLS. For MAC headers, the latch command and striping stage 130 removes 14 bytes for untagged packets and 18 bytes for tagged packets.

For MPLS header and Last Level Treated is IP, labels are removed until a label with a set S bit is detected. MPLS labels are 32 bit (4 byte) and the S bit is bit 23 in the label. MPLS labels are removed in this stage only if Last Level Treated is IP, which occurs when there is a single MPLS label (a null label). Removal of up to 4 labels is supported by the latch command and stripping stage 130. If MPLS labels are removed, the TTL field from the top label is saved and passed on to subsequent stages so the TTL field can be written to the IP header in accordance with a copy_TTL bit in the descriptor. TTL is handled in the header manipulation stage 120. The TTL from the label is passed in the descriptor together with a valid bit.

When removing the MAC from a packet, it is considered tagged according to the bit in the descriptor. EtherType is not checked. When removing a MAC (either tagged on not) and the packet is IP routed, EtherType is compared to MPLS (unicast or multicast) EtherType. This step determines whether MPLS labels are present in front of the IP header and need to be stripped at this stage.

If the packet is IP routed, the MPLS label was detected as the null label, which indicates that the next network layer is IP and the router can handle the packet. Therefore, IP routed packets can have only one MPLS label in front of the IP header. For more general operation, a search is made for a label with the S bit set. To prevent errors, the search is restricted to 4 labels. If S bit is not set within the 4 labels, 128 bits are removed and an error bit in the descriptor is set. This causes all of the stages in the header altering device 74 to ignore commands except for receiving the tunnel entry in the tunnel sync FIFO stage 134 (to avoid getting out of order).

Figure 9:
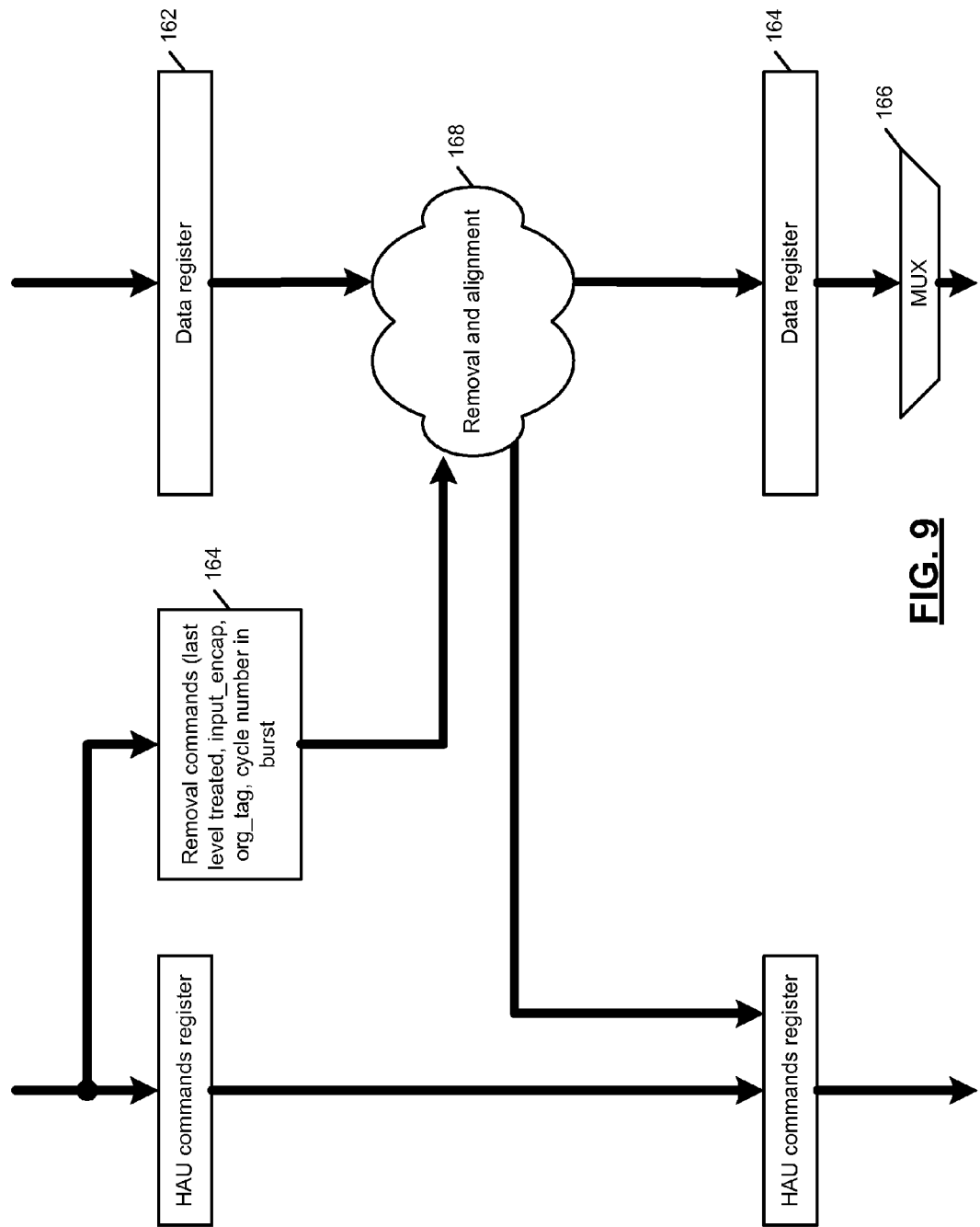
FIG. 9 illustrates a striping stage data path.

Referring now to FIG. 9, a data flow for the striping stage 130 is shown. The stripping is done in a pipeline manner using three 128 bit registers: register 162 (1×128 bits) and registers 164 (2×128 bits). After sampling the data from the SCI stage 120, data is written into two 128 bit registers 164 after the MAC and MPLS are removed. The data to the next stage is supplied by a multiplexer 166 that selects one of the two 128 bit registers 164 alternately.

Removal commands to a state machine 168 that controls the stripping are: LLT (Last Level Treated), First_encap, Src_tagged, Current burst cycle number (i.e. how many words went through this logic in this burst), EtherType==MPLS and/or MPLS S bit vector (4 bits taken from the current word, each one represent a S bit in a MPLS label).

Another function of the stage 130 is to request tunnel entries from the VLAN memory 70 if port commands from the port 62 include a tunnel layer output logical interface. The stage 110 cannot accept a new burst if the VLAN memory 90 has not generated an ack signal for a tunnel entry read (only when requested). The stage 130 blocks the next burst by using the dack_signal. The stage 130 provides an indication to next stage 134 when the stage 130 issues a request for a tunnel entry for the burst. This information is used to decide whether data needs to wait for the tunnel entry.

Since the tunnel sync FIFO stage 134 does not need the descriptor on the first cycle, the descriptor can be passed with the last signal. If a tunnel entry was requested for the burst, a wait4tunnel_signal (active low) is output by the stage 130 to the tunnel sync FIFO stage 134. As a result, the tunnel sync FIFO stage 134 holds the burst if the stage 134 is waiting for a valid tunnel entry.

The header manipulator stage 140 issues the ARP request to the MAC table 92 when Out_Link_Layer is Ethernet and the packet is not Ethernet bridged. The stage 140 blocks the next burst of data until the ARP request receives an ack (using the dack_signal). This stage 140 is also responsible for all changes to the current outermost header. At this point, the outermost header is the same header that was inspected by the Last Level Treated switch/route/bridge engine. The header manipulator stage 140 changes VLAN for bridged Ethernet packets, modifies TTL & DHCP, add sl MPLS label for IP routed packets, and/or manipulates MPLS labels for MPLS switched packets.

The header manipulator stage 140 has 4 different operating schemes IPv4, IPv6, MPLS, and Ethernet. The current header is Ethernet when Input_Encap is Ethernet and Last Level Treated is not MPLS switched or IP routed. The commands for the stage 140 are related to VLAN tagging. The stage 140 can remove, add, modify or do nothing. For add/modify commands, VID and VPT are taken from the descriptor.

When the current header is an MPLS label stack, the packet was MPLS switched. In this stage, up to 4 labels are popped or swapped or 1 label is pushed to the top of the label stack. The label to push or swap is in the descriptor. TTL in the MPLS stack will always follow the rule: output TTL=input TTL–Dec_TTL. This means that the TTL from the top of the stack is copied to the new top of the stack. If a Dec_TTL bit is set, it needs to be decremented by 1.

The current header is IPv4 when Last Level Treated is IPv4. The TTL is decremented and DSCP is replaced (if the descriptor requires it). When updating the IP header, the checksum is updated as well (incremental update of a 16 bit word at a time (according to RFC 1624, which is hereby incorporated by reference)). Each calculation is done in 1 cycle. Since TTL and TOS are not at the same byte inside a 16 bit word, a new 16 word is composed. The 16-bit word is {TTL,TOS} and is used in the incremental checksum calculation. Changing TOS and TTL updates the checksum in one calculation. 1 MPLS label can be added in this stage. Label and EXP are taken from the descriptor, TTL is taken from the IP header.

The Current header is IPv6 when Last Level Treated is IPv6. All of the actions done for IPv4 header can be performed. However, there is no need to update the checksum.

Figure 10A:
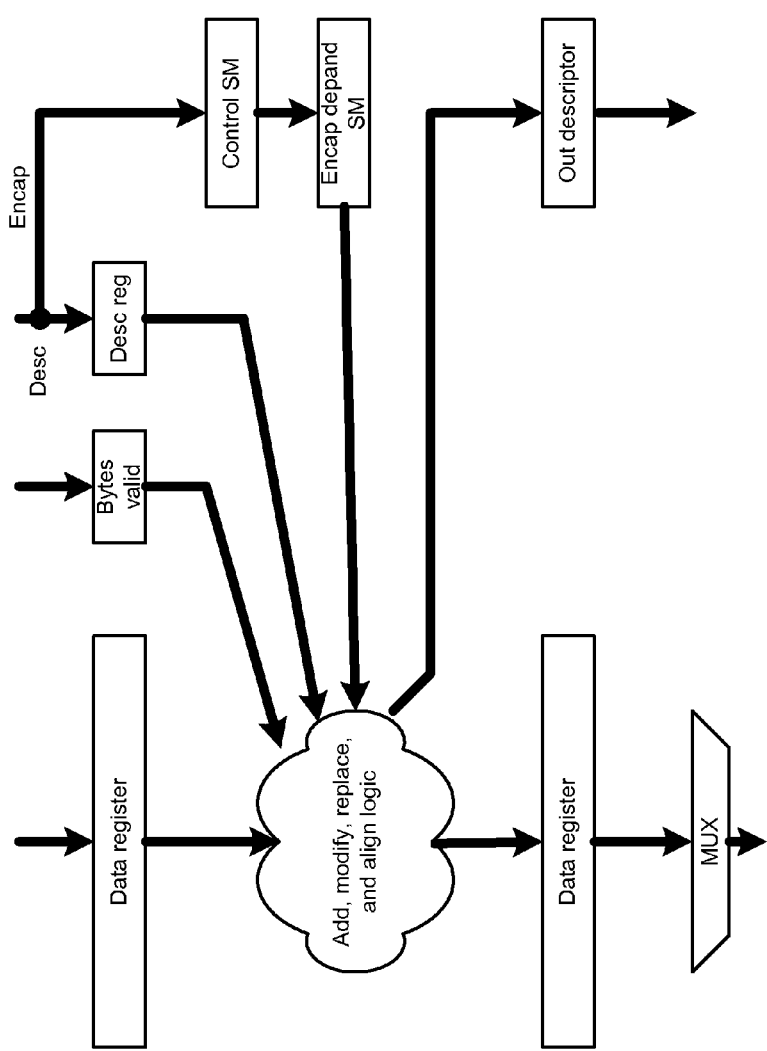
FIG. 10A illustrates a header manipulator stage data path.
Figure 10B:
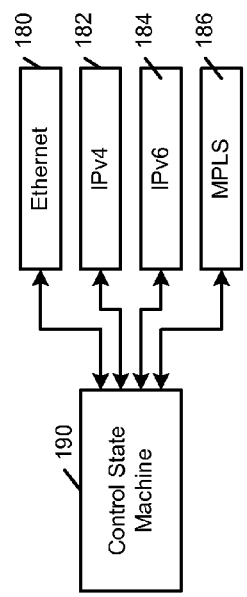
FIG. 10B illustrates state machines for implementing the header manipulator stage.

Referring now to FIGS. 10A and 106, a data flow diagram and state machines used in the stage 140 are shown. The stage 140 is preferably built using 5 different state machines. Four of the state machines 190, 182, 184 and 186 deal with the different encapsulations including Ethernet, IPv4, IPv6, and MPLS. A control state machine 190 controls the four state machines 180-186. The control state machine 190 handles a handshake with the previous stage and controls the data path according to the content of the descriptor. The control state machine makes decisions on the descriptor from previous stage while the specific encapsulation state machines 180-186 make decisions according to the sampled descriptor. The control state machine 190 is also responsible for activating a state machine that controls the ARP request when it is needed in either descriptor or tunnel entry. The stage 140 transfers the descriptor and the tunnel entry in the first cycle of data to the tunneling stage 122. The only field in the descriptor that the tunneling stage needs to update is the current_encap when the MPLS stack was totally removed.

Figure 11:
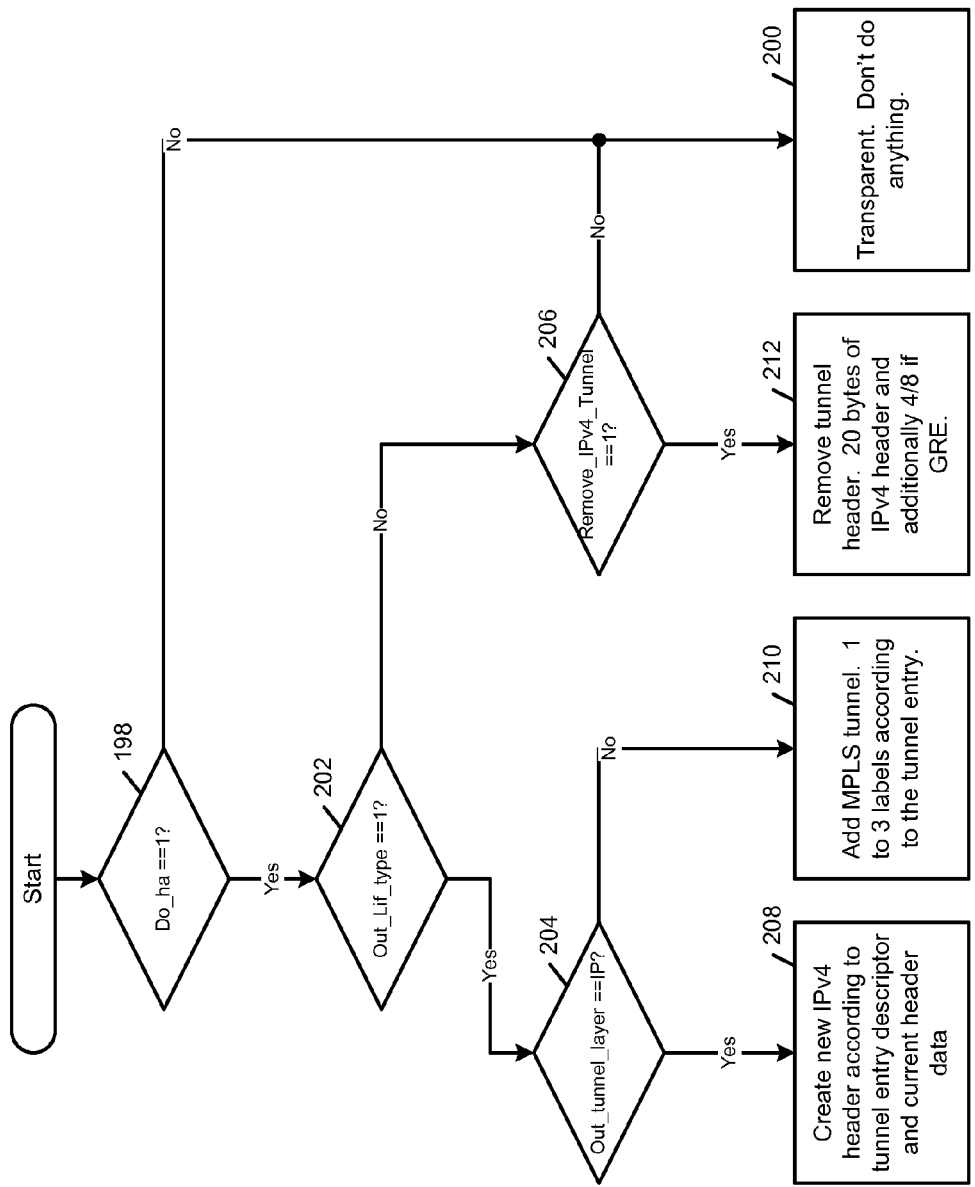
FIG. 11 illustrates steps performed by a tunneling stage.
Figure 12:
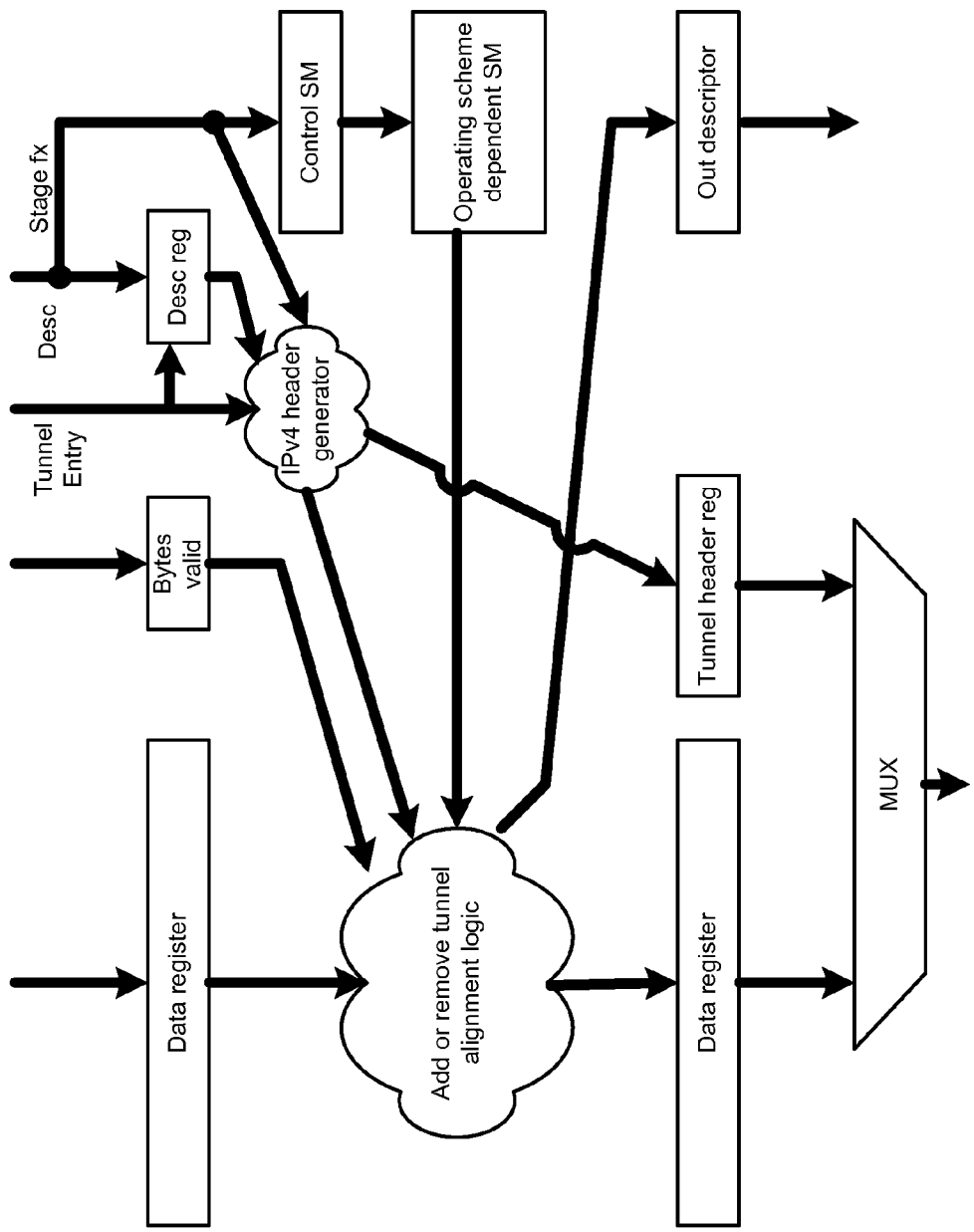
FIG. 12 illustrates a tunnel stage data path.

Referring now to FIGS. 11 and 12, steps performed by the tunneling stage 142 and a data flow diagram are shown. If do_ha is equal to 1 as determined is step 198, control continues with step 202. Otherwise, the stage 142 is transparent (step 200). The tunneling stage 142 removes IPv4 tunnels or adds IPv4 or MPLS tunnels. If Out_Tunnel_Layer is either IP or MPLS or the packet is IP routed and Remove_IPv4_Tunnel is set (as determined in steps 202, 204 and 206), then data is modified by the stage 142 in steps 208, 210 and 212. Otherwise the stage 142 is transparent. The tunneling stage 142 removes IPv4 tunnel header when the packet is IP routed and Remove_IPv4_Tunnel is set in the descriptor. When removing a tunnel, the protocol number in the IPv4 header is read to identify the type of tunnel to be removed.

When IPv4 in IPv4 is encountered, the header of a tunnel is 20 bytes long (assuming there are no options). DSCP and TTL fields from the tunnel header are saved before purging the header. The DSCP and TTL fields are copied into the inner IPv4 header according to copy_TTL and copy_DSCP bits in the descriptor. If the inner header was changed, the checksum is updated as well. Since the inner IPv4 header is not examined, the checksum is calculated manually.

When IPv6 in IPv4 is encountered, the DSCP and TTL fields in the IPv4 header are mapped into Traffic Class and Hop Limit fields in the IPv6 header. In IPv6, there is no checksum to update.

When the tunnel type is GRE (IP protocol 47), then a GRE header is examined as well as an IPv4 header. The fields in the GRE header that are check are Checksum Present (bit 0) and Protocol Type. If Checksum Present is set, the GRE header length is 64 bits. Otherwise the GRE header length is 32 bits. The Protocol Type is the EtherType for the payload. IPv4, IPv6 and MPLS are supported. The EtherType for those protocols is taken from registers. If the payload is IPv4 or IPv6, the DSCP and TTL from the IPv4 tunnel header are treated the same as in IPv4 in IPv4 tunnels specified above. If the payload is MPLS, the TTL is copied into the MPLS top of the stack label according to copy_TTL bit and EXP field is not touched in the label stack. MPLS does not require a checksum.

Initiating GRE tunnel. This tunnel is used when Out_Tunnel_layer is IP-in-IP and tunnel entry Type is GRE. GRE tunnels can used when current header is IPv4, IPv6 or MPLS. The GRE header is a 32 bit word attached after the IPv4 header.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A packet processor for a network device, the packet processor comprising:
    a plurality of ports including at least one incoming port and at least one outgoing port, the at least one incoming port configured to receive a data packet including a header portion and a data portion; and
    a header altering device, the header altering device comprising:
       a plurality of packet processing pipeline stages configured to process the data packet by modifying a data structure of the header portion while the data portion is stored in memory, each of the plurality of packet processing pipeline stages in the header altering device being assigned one or more tasks associated with modifying the data structure, the plurality of packet processing pipeline stages further configured to:
          determine whether to extract first header information from the data structure and selectively extract the first header information,
          selectively generate a modified header portion of the data packet using the extracted first header information, and
          retrieve the data portion from the memory and combine the data portion with the modified header portion.

2. The packet processor of claim 1, wherein at least one of the plurality of packet processing pipeline stages is further configured to add tunneling information to the data structure or remove tunneling information from the data structure.

3. The packet processor claim 1, wherein at least one of the plurality of packet processing pipeline stages is configured to process the data packet based on protocol layering requirements associated with the at least one outgoing port.

4. The packet processor of claim 1, wherein at least one of the plurality of packet processing pipeline stages is further configured to selectively hold the data packet in a respective one of the plurality of packet processing modules until at least one tunnel entry is received.

5. The packet processor of claim 1, wherein at least one of the plurality of packet processing pipeline stages is further configured to selectively hold the data packet in a respective one of the plurality of packet processing modules until at least one Address Resolution Protocol (ARP) entry is received.

6. The packet processor of claim 1, wherein at least one of the plurality of packet processing pipeline stages is further configured to selectively add a link layer to the data structure.

7. The packet processor of claim 1, wherein at least one of the plurality of packet processing pipeline stages is further configured to selectively add a Point to Point Protocol (PPP) layer to the data packet.

8. The packet processor of claim 1, wherein at least one of the plurality of packet processing pipeline stages is further configured to receive protocol layering requirements from the outgoing port in response to the outgoing port receiving control data associated with the data packet.

9. The packet processor of claim 1, wherein at least one of the plurality of packet processing pipeline stages is further configured to selectively modify the data packet to indicate processing requirements for processing the data packet.

10. The packet processor of claim 9, wherein the data packet indicates changes to a length of the data packet as a result of the data structure being modified.

11. The method of claim 10, further comprising selectively holding the data packet in a respective one of the plurality of packet processing pipeline stages until at least one Address Resolution Protocol (ARP) entry is received.

12. The method of claim 10, further comprising, using at least one of the plurality of packet processing pipeline stages, selectively adding a link layer to the data structure.

13. The method of claim 10, further comprising, using at least one of the plurality of packet processing pipeline stages, selectively adding a Point to Point Protocol (PPP) layer to the data packet.

14. The method of claim 10, further comprising, using at least one of the plurality of packet processing pipeline stages, receiving protocol layering requirements from an outgoing port in response to the outgoing port receiving control data associated with the data packet.

15. The method of claim 10, further comprising, using at least one of the plurality of packet processing pipeline stages, selectively modifying the data packet to indicate processing requirements for processing the data packet.

16. The method of claim 13, wherein the selectively modifying the data packet includes, using at least one of the plurality of packet processing pipeline stages, modifying the data packet to indicate changes to a length of the data packet as a result of the data structure being modified.

17. A method of operating a packet processor, the method comprising:
    receiving, at an incoming port, a data packet including a header portion and a data portion;
    using a plurality of packet processing pipeline stages in a header altering device, processing the data packet by modifying a data structure of the header portion while the data portion is stored in memory; and
    assigning each of the plurality of packet processing pipelines stages one or more tasks associated with modifying the data structure; wherein the modifying the data structure includes, using the plurality of packet processing pipeline stages,
       determining whether to extract first header information from the data structure and selectively extracting the first header information,
       selectively generating a modified header portion of the data packet using the extracted first header information, and retrieving the data portion from the memory and combining the data portion with the modified header portion.

18. The method of claim 17, wherein the modifying the data structure further includes, using at least one of the plurality of packet processing pipeline stages, adding tunneling information to the data structure or removing tunneling information from the data structure.

19. The method claim 17, further comprising, using at least one of the plurality of packet processing pipeline stages, processing the data packet based on protocol layering requirements associated with the at least one outgoing port.

20. The method of claim 17, further comprising selectively holding the data packet in a respective one of the plurality of packet processing pipeline stages until at least one tunnel entry is received.

\* \* \* \* \*